(12) United States Patent
Schlansker

(10) Patent No.: US 7,024,538 B2
(45) Date of Patent: Apr. 4, 2006

(54) PROCESSOR MULTIPLE FUNCTION UNITS EXECUTING CYCLE SPECIFYING VARIABLE LENGTH INSTRUCTION BLOCK AND USING COMMON TARGET BLOCK ADDRESS UPDATED POINTERS

(75) Inventor: Michael Steven Schlansker, Los Altos, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 718 days.

(21) Appl. No.: 10/032,177

(22) Filed: Dec. 21, 2001

(65) Prior Publication Data

US 2003/0120897 A1 Jun. 26, 2003

(51) Int. Cl.
*G06F 9/40* (2006.01)

(52) U.S. Cl. .......................... 712/24; 712/32; 712/205; 712/233; 712/245

(58) Field of Classification Search ................ 712/24, 712/32, 205, 233, 245
See application file for complete search history.

(56) References Cited

U.S. PATENT DOCUMENTS

| | | | |
|---|---|---|---|
| 5,588,118 A | 12/1996 | Mandava et al. ............. | 712/35 |
| 6,226,776 B1 | 5/2001 | Panchul et al. ................ | 716/3 |
| 6,393,551 B1 * | 5/2002 | Singh et al. ................. | 712/214 |

FOREIGN PATENT DOCUMENTS

| | | |
|---|---|---|
| EP | 0284364 A2 | 9/1988 |
| WO | WO9629645 | 9/1996 |

OTHER PUBLICATIONS

A Wolfe et al—"A Variable Instruction Stream Extension to the VLIW Architecture"—Fourth International Conference on Architectural Support for Programming Languages and Operating Systems (ASPLOS) Apr. 1991.

* cited by examiner

Primary Examiner—Kenneth S. Kim

(57) ABSTRACT

A multiprocessor data processing system for executing a program having branch instructions therein, each branch instruction specifying a target address in the program defining an instruction that is to be executed if that branch instruction causes the program to branch. The data processing system includes a plurality of processing sections having a function unit, a local memory, and a pointer. The local memory stores instruction sequences from the program that is to be executed by the function unit in that processing section. The pointer contains a value defining the next instruction in the local memory to be executed by the function unit. Each function unit executes instructions according to machine cycles, each function unit executing one instruction per machine cycle. The pointers in each of the processing sections are reset to a new value determined by the target address of one of the branch instructions when a function unit branches in response to that branch instruction.

23 Claims, 4 Drawing Sheets

PROCESSOR MULTIPLE FUNCTION UNITS EXECUTING CYCLE SPECIFYING VARIABLE LENGTH INSTRUCTION BLOCK AND USING COMMON TARGET BLOCK ADDRESS UPDATED POINTERS

FIELD OF THE INVENTION

The present invention relates to computer systems based on multiple processors, and more particularly, to computer systems that execute a plurality of instructions on each cycle.

BACKGROUND OF THE INVENTION

There are limits on the operational speed of any computational processing unit. Once these limits are reached, further increases in computational throughput can only be obtained through some form of parallel processing in which a plurality of computational function units operate together to execute a program. In one class of multiprocessing system, each of a plurality of processors executes one instruction from the program on each machine cycle. The set of instructions to be executed at the next instruction cycle is fed to the processor bank as a single very large instruction word (VLIW). Each processor executes part of this VLIW.

A VLIW processor requires an instruction word at each cycle that controls the set of operations, which are simultaneously issued on the function units. The simplest realization of a VLIW instruction unit is referred to as a "horizontal microcontroller". A horizontal microcontroller defines a horizontal instruction word that is divided into separate fields for each function unit. Each function unit (FU) requires a potentially distinct number of bits of information in order to specify the operation to be executed on that FU. Each operation's format may be further subdivided into fields such as an operation code, register operand specification, literal operand specification, and other information necessary to specify an allowed operation on the FU. In general, each function unit is responsible for decoding and executing its current operation as located in a fixed position within the horizontal instruction register.

In its simplest form, the instruction register within a simple horizontal microcontroller is divided into separate, fixed-size operation fields. Each operation field provides the controlling operation for one of the FUs. Each of the operation fields must be of sufficient size to encode all operations executed by the corresponding FU. Since each FU "knows" where its part of the instruction word starts, the individual FUs need not be concerned with the remainder of the instruction word.

This simple horizontal microcontroller has a number of advantages. First, the fetch of instructions from the instruction memory into the horizontal instruction register is direct without requiring any shifting or multiplexing of instruction bits from the instruction memory. Each of the operation fields within the instruction register is wired to a single function unit and again, no shifting or multiplexing is required to properly provide an operation the corresponding function unit.

Second, instructions for horizontal microcontrollers are laid out sequentially in memory. Multiple operations within a single instruction are contiguous and are followed by the next instruction in turn.

Third, the horizontal microcontroller can be implemented in extensible VLIW configurations. Here, the instruction memory is broken into a separate instruction memory for each of the function units. Each function unit uses a separate instruction sequencer to select each operation from its instruction memory. Branches are performed by broadcasting the branch target address to all instruction sequences. Because all operation fields are of fixed size, a branch target address can be used to uniformly index into all instruction memories in order to select the appropriate next operation for all function units. An instruction cache can be readily distributed in a similar manner.

Unfortunately, horizontal microcontrollers are less than ideal. In particular, the amount of instruction memory required to represent the VLIW program is often excessive. VLIW programs frequently use NOOP operations. NOOP operations are commands, which leave the corresponding function unit idle, and may represent a substantial number of operations in the program. In principle, a NOOP could be specified using very few instruction bits, however, the horizontal microinstruction uses fixed size fields to maintain simplicity. The same number of bits is required to represent a NOOP on a given function unit as is required to represent the widest operation on that function unit. Wide operations often specify laterals, branch target addresses, and multiple input and output operands. As wider operations are defined, even operations which specify very little information uniformly, bear the high cost.

Variable width VLIW formats are designed to alleviate this problem. Both the Multiflow and Cydrome VLIW processors provide capabilities to more efficiently represent NOOPs within VLIW programs. Each of these machines uses the concept of a variable width VLIW instruction to more efficiently represent the set of operations which are executed within a single cycle. From a code size viewpoint, it is attractive to allow variable width operations on each of the function units. Variable width operations allow some operations to be represented with only a few bits while other operations are represented with a substantially larger number of bits. When operations are of variable size, it is desirable that the VLIW instruction also be of variable size in order to allow the independent specification of multiple variable-sized operations to be executed within a single cycle.

Unfortunately, the use of variable width formats to compress VLIW instruction representations leads to more complex hardware. The problem of building an instruction unit for variable width VLIW instructions can be divided conceptually into two sub-problems. The first sub-problem is that of acquiring an aligned instruction word from the instruction memory. To accommodate variable instruction width, the instruction fetch unit must acquire an instruction field that is displaced by a variable amount from the origin of the previous instruction. Each newly fetched instruction must be shifted by a variable amount depending on the size of the previous instruction. Since instructions are of variable size, instructions may also span word boundaries within a fixed word size instruction memory.

The second sub-problem is that of identifying each of the operations within the aligned instruction and transmitting them to each of the corresponding function units. The leftmost operation is considered to be aligned, because the instruction is aligned. Each subsequent operation is identified, starting at the instruction origin, by skipping over all operations to its left. However, since each of the operations is of variable width, this requires substantial shifting of fields to correctly isolate each operation. The hardware needed to overcome these problems significantly increases the cost of such variable width instruction embodiments.

Broadly, it is the object of the present invention to provide an improved variable width VLIW processor.

It is a further object of the present invention to provide a variable width VLIW processor that requires less memory and/or complex decoding hardware than prior art processors.

These and other objects of the present invention will become apparent to those skilled in the art from the following detailed description of the invention and the accompanying drawings.

SUMMARY OF THE INVENTION

The present invention is a multiprocessor data processing system for executing a program having branch instructions therein, each branch instruction specifying a target address in the program defining an instruction that is to be executed if that branch instruction causes the program to branch. The data processing system includes a plurality of processing sections. Each processing section includes a function unit, a local memory, and a pointer. The local memory stores instruction sequences from the program that are to be executed by the function unit in that processing section. The pointer contains a value defining the next instruction in the local memory to be executed by the function unit. Each processing section executes part of the program, each function unit executing instructions synchronously with the other function units. The pointers in each of the processing sections are reset to a new value determined by the target address of one of the branch instructions when a function unit branches in response to that branch instruction. The data processing can include a memory for storing a mapping for each target address in the program. The mapping specifies a value for each of the pointers for each target address. In the preferred embodiment of the present invention, the instruction sequences stored in one of the local memories comprise instructions having different lengths. In one embodiment of the invention, the program is divided into super instructions. Each super instruction includes a linear block of code that can only be entered at a starting address corresponding to that block and each block of code also has one or more branch instructions, at least one of the branch instructions having a target address corresponding to a super instruction in the program. The super instruction is divided into sets of instructions to be executed on each machine cycle by each processor. Embodiments in which the local memories are implemented as cache memories may also be practiced.

DETAILED DESCRIPTION OF THE INVENTION

Figure 1:
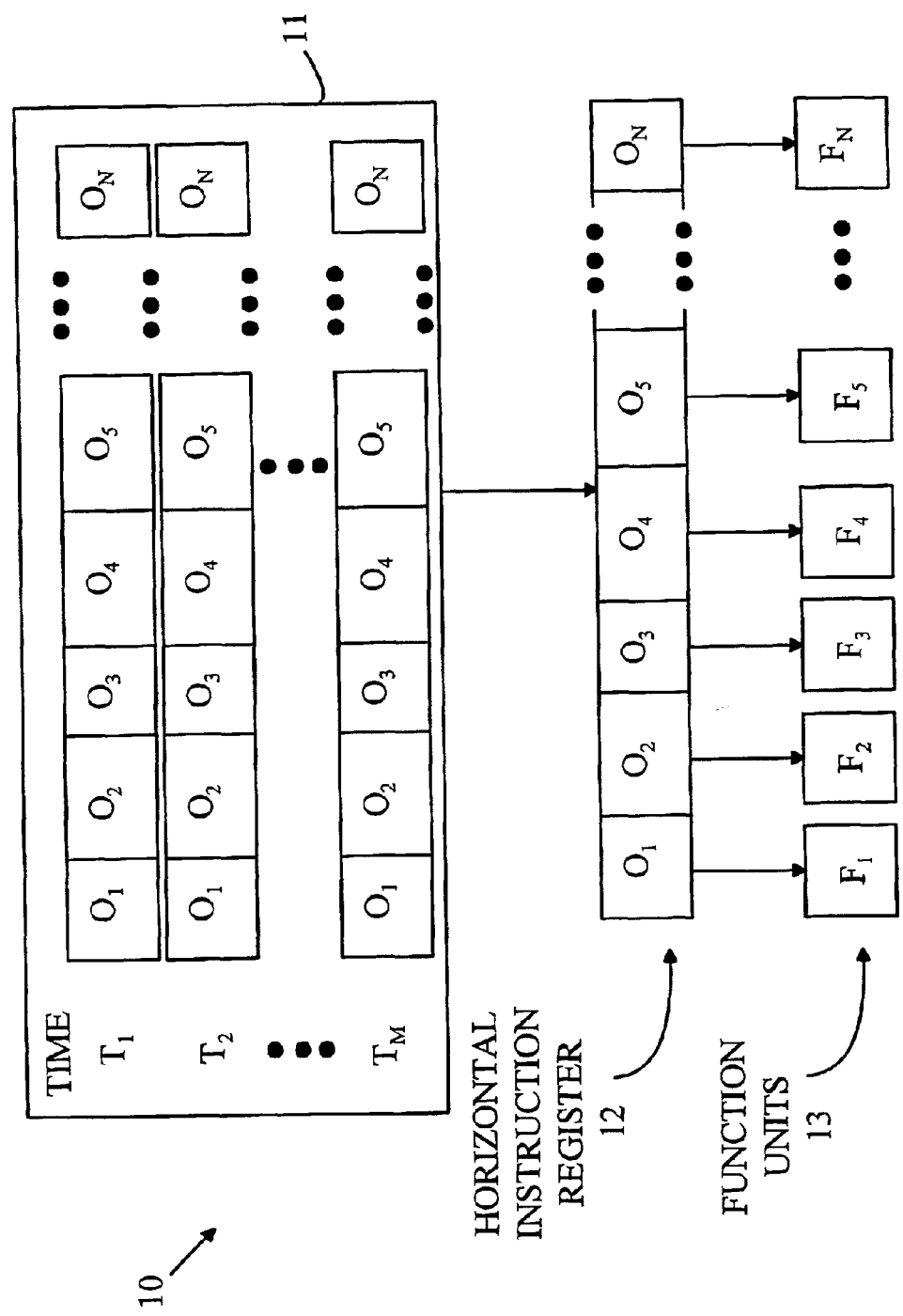
FIG. 1 is a block diagram of a horizontal microcontroller 10.

The manner in which the present invention provides its advantages may be more easily understood with reference to FIG. 1, which is a block diagram of a horizontal microcontroller 10. Microcontroller 10 includes N function units shown at 13 and labeled as F1, . . . , Fn. Each function unit obtains its next instruction from a portion of a horizontal instruction register 12. The horizontal instruction register is loaded each cycle from an instruction memory shown at 11. The instruction memory is organized as a sequence of vectors in which each vector is composed of the N operands that define the operations to be carried out for one time cycle. Instructions for horizontal microcontroller 10 are laid out sequentially in memory. Conventional approaches for representing VLIW instructions represent information horizontally within the instruction memory in a manner that is consistent with their usage in time. That is, all instruction bits that are issued within a single cycle are contiguous in the instruction memory. Operations executing on the function units at T1 are contiguous and are followed by the operations executing on the function units at T2, etc.

As noted above, this type of architecture requires an inefficient use of memory or complex function unit hardware. If all operands are of a fixed length, than each vector is of a fixed length and requires the same amount of memory independent of the amount of information in the vector. If the operands are of variable length to conserve memory, then each function unit must contain the hardware needed to determine where in the instruction register the operand for that function unit is located. In addition, each function unit must be able to access a substantial fraction of the instruction register, as the location of its next instruction can vary widely from time cycle to time cycle. Hence, the interconnect hardware between the instruction register and the function units must be significantly more complex than that needed for fixed length instruction words.

A VLIW processor according to the present invention will be referred to as a distributed VLIW processor (DVLIW). A DVLIW processor avoids the problems discussed above by utilizing an architecture in which each function has a local memory for storing its instruction sequences. In addition, the program is compiled into a "vertical" layout which separates the instruction sequences for each function unit in a manner that preserves the synchronization of the function units while allowing the code to be maintained as variable length instruction words to provide better code compaction.

In general, the program is divided into program regions referred to as super blocks. A super block is a linear code sequence, which is entered only at the top. The code sequence is allowed to have multiple exits that are represented by branch operations that conditionally execute within the super block. The only way to enter the region is by branching to the first instruction of the super block. For reasons to be discussed below, a super block is one form of "super instruction" as described in more detail below. In general, a branch within a super block to another super block references the target super block by its "name". The name, however, may be the address in main memory at which the code for the super block is stored.

A super block in the computer code is compiled into one or more super instructions that are executed on the DWLIW. A super instruction can be represented in the schematic form shown in FIG. 2, which illustrates the operations that are carried out at each machine cycle of the super instruction. Each entry in the table represents an operation to be carried out by a function unit on some machine cycle. Each machine cycle is represented by one row. All of the operations on a given row are issued simultaneously on the corresponding machine cycle, one per function unit. The columns correspond to the functional units upon which operations are executed. Each X represents an operation of arbitrary size that is to be executed at a time indicated by its row and on a function unit indicated by its column. Blank squares indicate NOOPs.

Figures 2, 3:
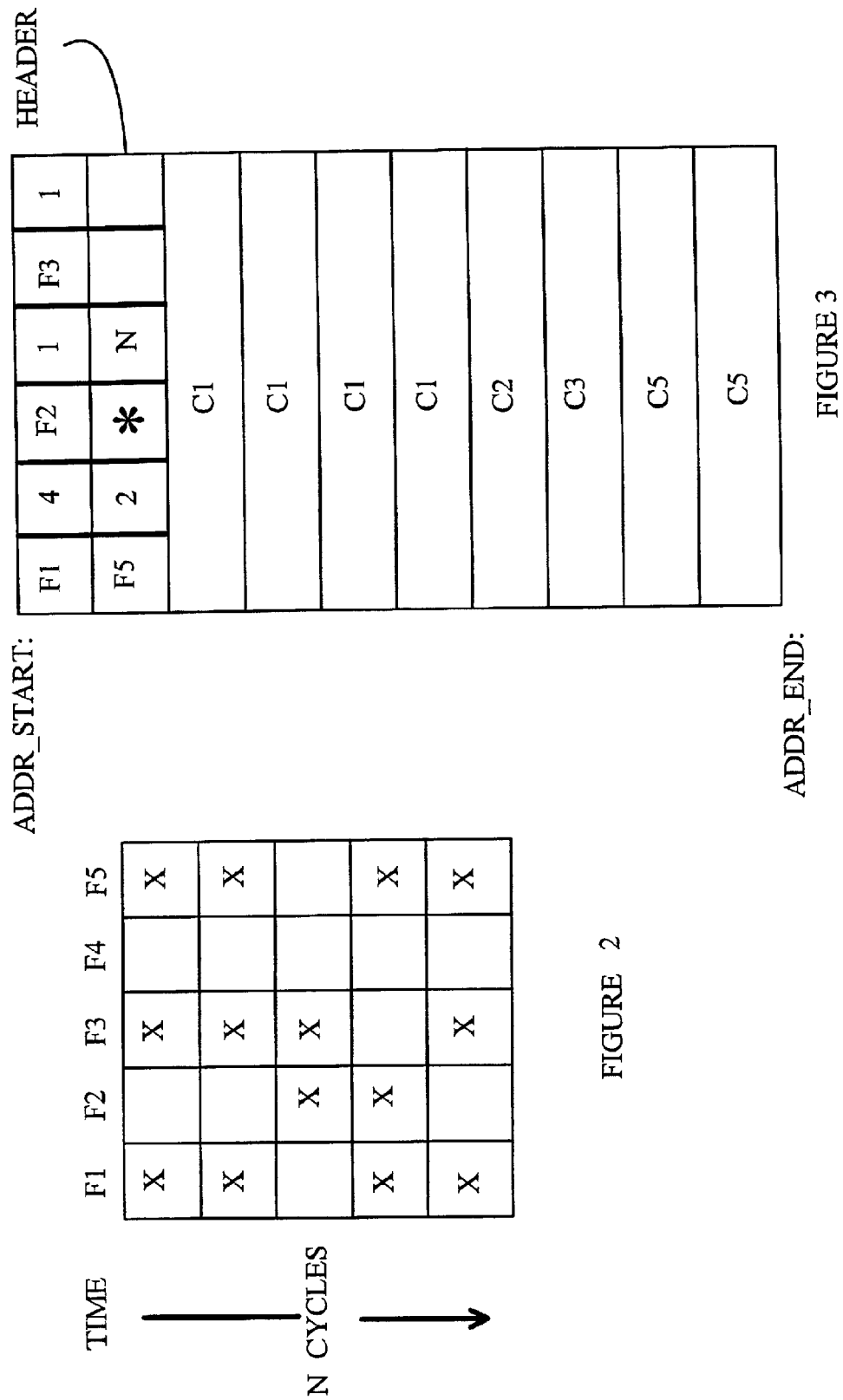
FIG. 2 illustrates the operations that are carried out at each machine cycle of the super instruction.
FIG. 3 is an example of a main memory representation of a super instruction.

Refer now to FIG. 3, which is an example of a main memory representation of a different super instruction. The label ADDR_START indicates the starting address of the super instruction. The first two words are tag words containing a list of tuples ((F1, 4), (F2, 1), (F3, 1), (F5, 2)). The asterisk indicates an end marker that terminates the list of tuples. The final marking N indicates the total number of cycles executed by the super instruction. Each of the symbols described in this discussion must be assigned a detailed binary code. The actual binary codes used are a matter of design choice and will not be discussed in detail here.

Each tuple names a function unit on which execution occurs and a corresponding number of main memory instruction words needed to represent the list of operations to be executed on the function unit in behalf of the super instruction. Thus, (F1, 4) indicates that the first four words (labeled C1) after the tag header are to be sent to the distributed instruction cache corresponding to function unit one. These four words hold operation text which when interpreted by the operation decoder for F1 carry out a sequence of operations (including NOOPs) as specified in the F1 column of the logical super instruction. In the preferred embodiment of the present invention, a tuple is not provided for any FU that remains idle over the entire duration of the super instruction. The lack of such a tuple is interpreted as a sequence of NOOPs of the appropriate length.

Figure 4:
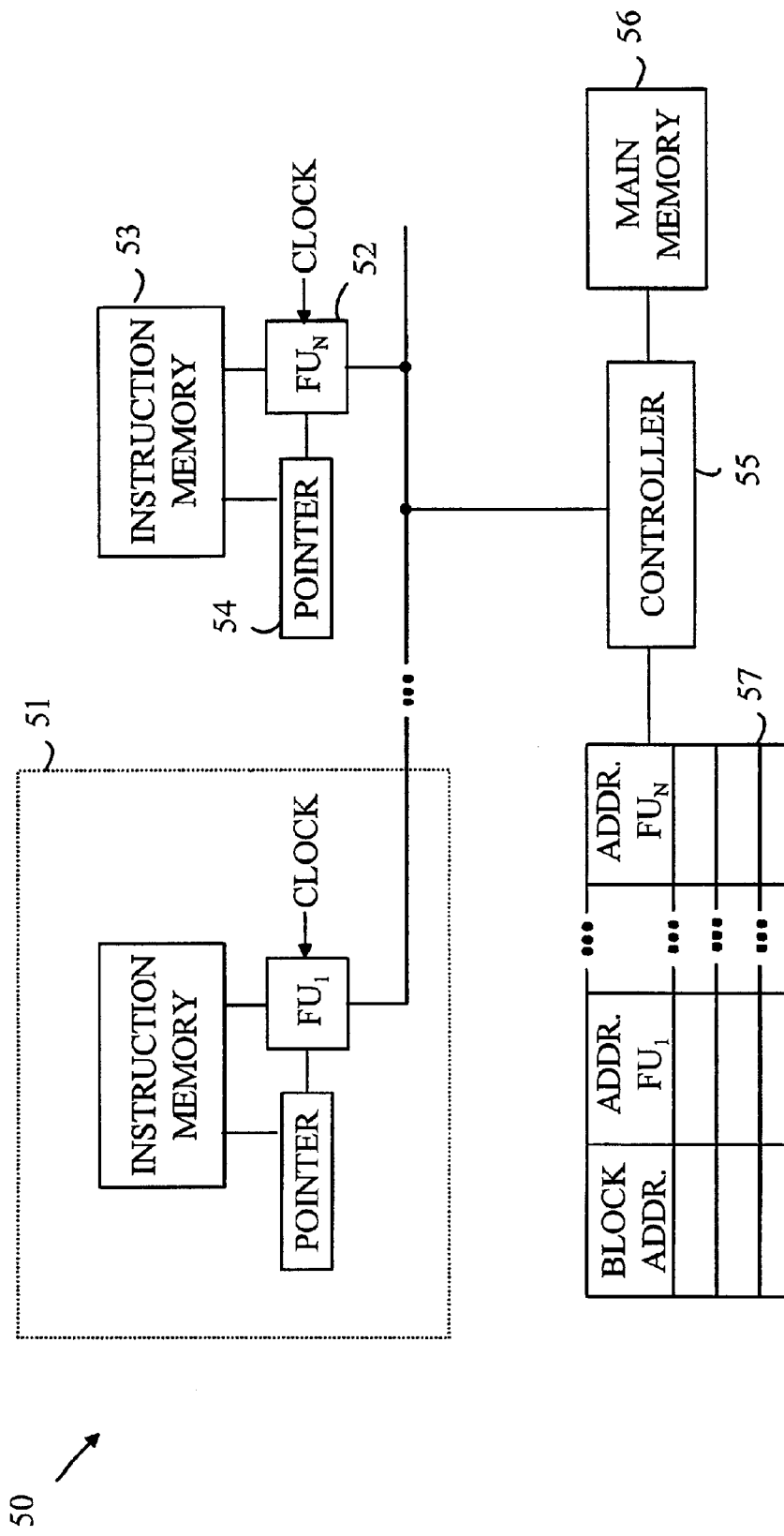
FIG. 4 is a block diagram of a DVLIW processor according to the present invention.

Refer now to FIG. 4, which is a block diagram of a DVLIW processor according to the present invention. Processor 50 is constructed from a plurality of processing sections 51. Each processing section includes a local instruction memory 53, a function unit 52, and a pointer 54 that specifies the next instruction to be executed in memory 53 by function unit 52. The local memories contain the portion of each super instruction that is to be executed on the corresponding function unit, i.e., the code from the column of the super instruction, as represented in the format shown in FIG. 2, corresponding to that function unit. The processing sections are synchronized with one another such that each function unit is executing the correct operation at any given time. That is, the processing sections step through the super instruction one row at a time with the row changing on each machine cycle.

When one of the function units executes a branch, the branch target is broadcast to all of the function units and to controller 55. The branch target will be the "name" of the next super instruction to be executed. This name is typically the address of the super block in main memory. Controller 55 utilizes a lookup table 57 to ascertain the local address in each of the instruction memories at which the new super instruction starts. If there are N processing sections, there will be N such addresses. Each address is then loaded in the pointer register for the corresponding processing section. The various processing sections then resume execution of the programs stored therein at the location specified by the pointers.

The local instruction memories can be loaded from main memory at the start of the program. Alternatively, the local memories can receive the code corresponding to any particular super instruction at the time of a branch to that super instruction. A combination of these two strategies can also be practiced. For example, code for super instructions that are executed more than once may be stored in the local memories with less used code being stored in main memory. The local instruction memories can be implemented as conventional memories or as cache memories.

The lookup table 57 discussed above can be distributed to the local instruction memories. In this case, only the information relevant to the particular function unit associated with the local memory is stored in that processing section's local instruction memory. In such embodiments, each processing section looks up the appropriate local starting address corresponding to the super instruction identified in the broadcasted branch.

When a super instruction executes to completion without branching, a mechanism is needed to identify the fall-through super instruction, which is contiguous with and after the current super instruction in the program being executed. The compiler can solve this problem by attaching a branch instruction that identifies the next super instruction at the end of the instruction sequence for one of the function units. Alternatively, lookup table 57 can include a column containing a cycle count for each super instruction and the identity of the "fall-through" super instruction. Controller 55 would then force the branch if the cycle count were exceeded without a branch being taken by one of the function units.

Each function unit is separately responsible for interpreting its own operation text stream. The interpretation of the text stream results in an execution pattern consistent with the virtual super instruction timing requirements. NOOP operations must be encoded in operation text stream so as to preserve the accuracy of the virtual program schedule. Each FU may use a distinct variable width or fixed width instruction encoding scheme according to its needs. Since interpretation is separately performed for each FU, there is no interaction between the interpretation on one function unit and the interpretation on another. Accordingly, the present invention avoids the hardware complexities of prior art systems that utilize variable length operation fields while providing comparable code compaction.

Figure 5:
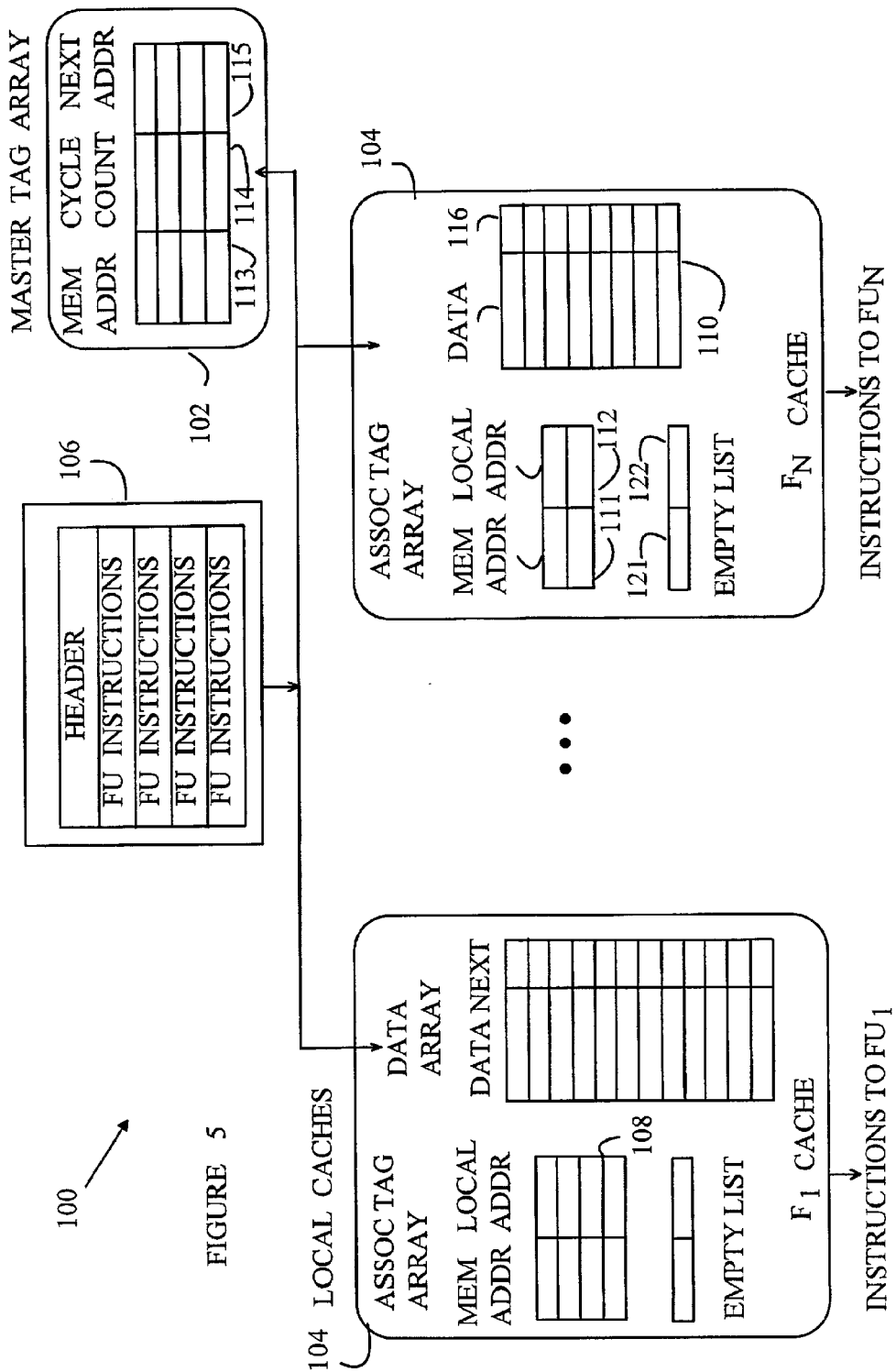
FIG. 5 is a schematic drawing of a distributed instruction cache according to the present invention.

As noted above, embodiments of the present invention in which the local memories are caches can also be practiced. Refer now to FIG. 5, which is a schematic drawing of a distributed instruction cache 100 according to the present invention. Instruction cache 100 includes a master tag array 102 and a local instruction cache 104 for each of the function units. When a program branch occurs, the address of the target location in main memory 106 is used to identify appropriate material within each of the instruction caches 104. Each instruction cache 104 has an associative cache tag array 108, which associates the target address with a local address identifying where the operation sequence for the corresponding function unit resides within the FU's cache data array.

When the functions units are powered up, the caches will be empty, hence a branch results in the lookup failing on all of the associative tag arrays. This triggers a cache fault. The branch target address is then deposited into each of the tag arrays and each local address tag is initialized to a nil value indicating that there is no instruction text for the corresponding function unit. To fill the caches, the super instruction header is parsed. Each of the FU tuples are identified and used to direct the operation text for each FU to that unit.

The memory address field within the associative tag array in each of the local caches takes on the value of the super instruction target address. When, for a given FU, operation text is transmitted, an empty location within the corresponding local cache data array 110 is identified and filled with FU operation text. As each function unit receives its operation text, the information is deposited into the corresponding cache data array 110. The local address field 112 of the associative tag array is used to link the superinstruction main memory address 111 to the FU operation text. To support large super instructions, the cache data array 110 provides a next field 116 that allows the extension of the operation text size using linked list techniques.

When the last tuple is processed indicating that the operation text for all function units has been loaded, the super instruction is finalized by loading the master tag array 102. An empty entry within the master tag array is identified and the address of the super instruction is entered into the memory address field 113. The cycle count N from the super instruction header is entered into the master tag array in field 114. After the main memory super instruction text is fully parsed, the address of the next super instruction in memory is identified and is also entered into the master tag array in field 115.

Empty entries within a local cache data array are linked to the empty list head 121. Standard linked list techniques are used to identify available data array entries when new super instructions are deposited into the instruction cache. When a super instruction is purged from the instruction cache, all corresponding data entries are linked onto the tail 122 of the empty list and all corresponding associative tag entries are cleared.

In the preferred embodiment of the present invention, a super instruction is always either fully resident within the instruction cache or fully absent. If a superinstruction is too large to fit into the instruction caches, the superinstruction is broken into smaller super instructions that will fit into the instruction caches.

When a branch is encountered within a super instruction, the target address specified in the super instruction is broadcast to each function unit. The target super instruction address is used to look up the corresponding operation text for each FU. All lookups are performed in parallel. Each FU begins interpreting its stream of operations using a FU specific instruction format. It should be noted that the only information that must be passed globally to execute the super instruction is the branch target address.

As noted above, when a super instruction executes to completion without branching, a mechanism is needed to identify the fall-through super instruction that is contiguous with and after the current super instruction in main memory. The master tag array performs this task in the embodiment shown in FIG. 5 by simulating a branch when the end of the super instruction is reached. The end of the super instruction is detected using the cycle count, which is decremented until the super instruction is finished. A subsequent super instruction may not be contiguous with the current super instruction in cache, and must be identified by simulating a branch's use of the associative tag lookup. When the super instruction completes, the master-tag-array next address is used to simulate a branch to the subsequent fall-through super instruction.

Embodiments of the present invention in which branches are pipelined so that a branch takes more than one cycle to execute can also be practiced. Such embodiments allow more than one cycle to perform tag array lookup and the use of the cache local address pointer to index into the actual operation text for each FU. If branches are pipelined, the fall-through branch as constructed by the master tag array is pipelined in a similar manner.

Various modifications to the present invention will become apparent to those skilled in the art from the foregoing description and accompanying drawings. Accordingly, the present invention is to be limited solely by the scope of the following claims.

What is claimed is:

1. A data processing system for executing a program having branch instructions therein, each branch instruction specifying a target address in said program defining an instruction that is to be executed if that branch instruction causes said program to branch, said data processing system comprising:
    a plurality of processing sections, each processing section comprising:
        a local memory for storing instruction sequences from said program that are to be executed by that processing section, said instruction sequences comprising instructions of different lengths;
        a function unit for executing instructions stored in said local memory; and
        a pointer containing a value defining the next instruction in said local memory to be executed by said function unit, wherein each processing section executes part of said program;
        each function unit executes instructions according to machine cycles, each function unit executing one instruction per machine cycle; and
        said pointers in each of said processing sections are reset to a new value determined by said target address of one of said branch instructions when a function unit branches in response to that branch instruction.

2. The data processing system of claim 1 further comprising a memory for determining said new value of said pointers, said memory storing a mapping for each target address in said program specifying one of said pointer values for each of said pointers corresponding to that target address.

3. The data processing system of claim 1 wherein said program is divided into super instructions, each super instruction comprising a linear block of code that can only be entered at a starting address corresponding to said block of code and each block of code having one or more branch instructions, wherein said target address of at least one of said branch instructions corresponds to a starting address of a super instruction in said program.

4. The data processing system of claim 1 wherein at least one of said instruction sequences comprises at least one no op instruction.

5. The data processing system of claim 1 wherein said local memory of one of said processing sections comprises a cache memory.

6. The data processing system of claim 3 further comprising at least one processing section that remains idle for the duration of a super instruction.

7. The data processing system of claim 3 wherein a super instruction comprises a tuple for each processing section that is not idle for the duration of said super instruction and wherein each tuple identifies a function unit on which execution occurs and a number of memory words needed to represent corresponding operations to be executed on said function unit.

8. The data processing system of claim 3 wherein a super instruction indicates a total number of machine cycles for said super instruction.

9. The data processing system of claim 3 wherein said local memories are loaded at a start of said program.

10. The data processing system of claim 3 wherein said local memories are loaded at the time of a branch to a super instruction.

11. The data processing system of claim 3 wherein a fall-through super instruction is executed when a super instruction executes without branching.

12. A data processing system for executing a super instruction according to machine cycles, said super instruction comprising a linear block of code including instruction sequences to be executed by each of a plurality of processing sections and one or more branch instructions, the data processing system comprising:

a plurality of processing sections, each processing section comprising:

a local memory for storing instruction sequences of the super instruction that are to be executed by that processing section;

a function unit for executing instructions stored in said local memory according to machine cycles, each function unit executing one instruction per machine cycle; and a pointer containing a value defining the next instruction in said local memory to be executed by said function unit, the pointers in each of said processing sections being reset to a new value determined by a target address of one of said branch instructions when a function unit branches in response to that branch instruction.

13. The data processing system of claim 12 wherein said linear block of code of said super instruction can only be entered at a starting address.

14. The data processing system of claim 12 wherein a fall-through super instruction is executed when said super instruction executes without branching.

15. The data processing system of claim 12 wherein said target address of at least one of said branch instructions corresponds to a starting address of another super instruction.

16. The data processing system of claim 12 further comprising a memory for determining said new value of said pointers, said memory storing a mapping for each target address specifying one of said pointer values for each of said pointers corresponding to that target address.

17. The data processing system of claim 12 wherein at least one of said instruction sequences comprises at least one no op instruction.

18. The data processing system of claim 12 said instruction sequences comprise instructions of different lengths.

19. The data processing system of claim 12 further comprising at least one processing section that remains idle for the duration of the super instruction.

20. The data processing system of claim 12 wherein said super instruction comprises a tuple for each processing section that is not idle for the duration of said super instruction and wherein each tuple identifies a function unit on which execution occurs and a number of memory words needed to represent corresponding operations to be executed on said function unit.

21. The data processing system of claim 12 wherein said super instruction indicates a total number of machine cycles for said super instruction.

22. The data processing system of claim 12 wherein said local memories are loaded at a start of a program that includes said super instruction.

23. The data processing system of claim 12 wherein said local memories are loaded at the time of a branch to said super instruction.

* * * * *